March 4, 1952     L. FRANCESCHINI     2,588,105
AUXILIARY OPTICAL DEVICE FOR PHASE MICROSCOPES
Filed Aug. 2, 1948
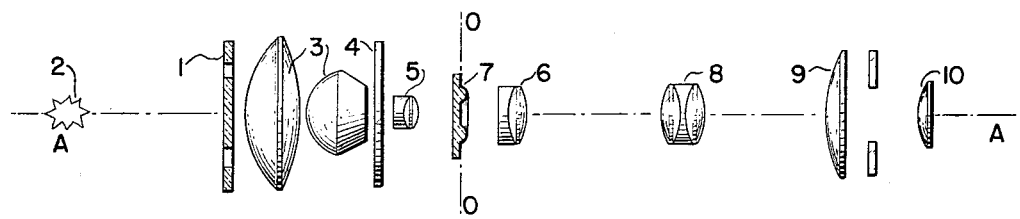
FIG.I.
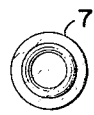
FIG.IA.     FIG.IB.
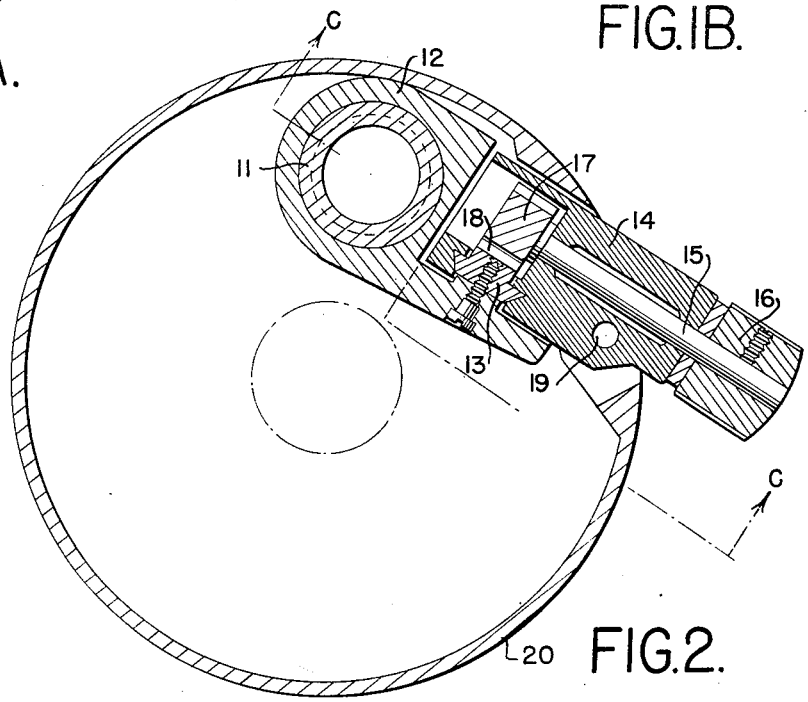
FIG.2.
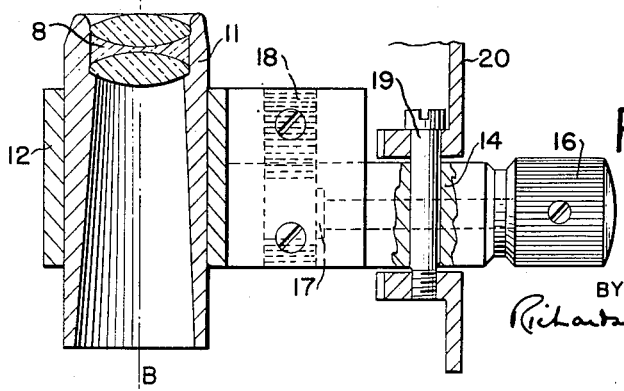
FIG.3.
INVENTOR
LORENZO FRANCESCHINI
BY
ATTORNEYS Patented Mar. 4, 1952

2,588,105

UNITED STATES PATENT OFFICE 2,588,105

AUXILIARY OPTICAL DEVICE FOR PHASE MICROSCOPES

Lorenzo Franceschini, Florence, Italy, assignor to Societa per Azioni Officine Galileo, Florence, Italy, an Italian corporation Application August 2, 1948, Serial No. 41,954
In Italy August 22, 1947

2 Claims. (Cl. 88—39)

1

It is known that essential conditions for the function of a microscope for so called phase contrast examination are: overlapping of the image of the source of light (which is generally a ring-shaped slit) onto the plane of the phase device (phasenplatchen-diffraction plate) which is in most cases arranged inside the object system of the microscope; and centering the source of light with respect to the phase device.

Since the size of the phase device varies with the varying power of the lens system fitted to the microscope, it is necessary that the size of the luminous slit acting as the source of light be adapted to these devices; this is obtained either by inserting members having different annular openings according to the different object glasses or by adopting the variable enlargement—obtained with the apposite (panchromatic) optical system—of a single luminous aperture.

When the microscope so equipped is in use, the operator must be able to control the general conditions of coincidence between the light opening and the phase device, since it is mainly by this control that he can obtain the highest efficiency of the instrument. At the present time a telescope is used for this purpose and is fitted to the microscope in place of the optical group of the ocular (eyepiece) system which is temporarily removed from the instrument. This is an operation which requires a certain degree of attention and on which some time must be spent. Consequently it is not employed in practice with such frequency as would be advisable.

An object of the present invention is to provide a device able to obviate the above mentioned disadvantages and make it possible to carry out an examination with ease and rapidity with the instrument under the above-mentioned conditions, without removing the optical group of the ocular system. According to the invention, a lens is added to the optical system of the microscope, this lens being so mounted and placed that it may be fitted to or removed from the optical system at will: said lens being calculated to form a telescope able to focus on the phase device, when associated with the normal eye-piece of the microscope.

To obtain this result, the lens is mounted in an apposite support opportunely wrought, which may be operated from a point external to the instrument, and by means of which support the position of the object glass may be controlled, both in depth and laterally with respect to the optical system of the microscope.

The invention will be better understood from

2 the following description together with the accompanying drawing which shows—solely by way of example—one form of embodiment of the invention.

In the drawing:

Fig. 1 shows an optical scheme of the microscope equipped for phase contrast examination, the device of this invention being therein included;

Fig. 1A is a view in elevation of the slit element shown in Fig. 1;

Fig. 1B is a view in elevation of the phase displacement element shown in Fig. 1;

Fig. 2 shows a cross section of the device;

Fig. 3 shows a section in elevation of the said device, on the line C—C of Fig. 2.

In the drawings: the number 1 indicates the luminous slit of the source of light 2; 3 indicates the object glass acting as condenser; 4 indicates the specimen table (the specimen represents the phase screen); 5 and 6 the object glass system; the phase device arranged inside the object glass system, is indicated by 7; 8 marks the object glass which may be inserted at will in the optical system of the microscope; lastly 9 and 10 indicate the eye-piece system.

The image of the slit opening illuminated by 2 (which acts as a source of light) is thrown, through the agency of 3 and 5, on the plane of the line 0—0 where lies the phase displacement device 7; insertion of 8 into the optical system brings about the formation, in combination with 9 and 10 of a telescope by means of which the operator may, by focusing on the phase device, verify the position of the image 1 in relation thereto.

The support 11 of this object glass 8 is arranged so as to form a unit with, but not permanently and inseparably connected with a tube 12, which is formed integrally with a prismatic member 13 slidably guided in a groove cut for this purpose in the main support 14. A shaft 15 operated by a button 16 runs longitudinally through said main support; the shaft carries a pinion 17 which engages with a rack 18 unitary with the prismatic member 13. When the button 16 is turned, it will therefore bring about, together with a displacement of the prismatic member 13, a displacement of the tube along its own axis, and together with the tube a displacement of the object glass 8.

The support 14 may rotate round a pin 19 fixed to the tube 20 of the microscope, suitable mechanical means of known type, and therefore not shown in the drawing, being provided to bring the support back to the two extreme positions that it may take for insertion into or removal from the optic system of the said object glass 8, and to guarantee its stability.

Having now particularly described and ascertained the nature of my said invention and in what manner the same is to be performed, I declare that what I claim is:

1. In a phase contrast examination microscope having a tube and an optical axis which includes an objective lens system, an ocular lens system, a displaceable member provided with a slit formed therein and positioned between a source of light and said objective lens system to form a luminous slit, and a diffraction plate positioned between the objective lens system and said ocular lens system, the improvement which comprises: an auxiliary device including; an auxiliary optical lens system positioned between said diffraction plate and said ocular lens system, said auxiliary optical lens system forming, together with said ocular lens system of said microscope, a telescope which is capable of focussing on that plane wherein said diffraction plate is positioned, thereby permitting the operator to position said luminous slit so as to superimpose its image on said diffraction plate and to center said image in relation to said diffraction plate, said device also including means for moving said auxiliary optical lens system into and removing it from the microscope optical axis, whilst at the same time permitting all optically functioning elements hitherto recited, save only the said auxiliary optical lens system, to remain positioned in normal functioning relationship, whereby said auxiliary optical lens system when moved into the optical path effectively forms a telescope for preliminary adjustment and, when removed from said optical path, allows the microscope to function normally.

2. A microscope according to claim 1, in which said auxiliary device includes a lens support for said auxiliary optical lens system, a tube in which said lens support is securely retained, a main support in which said lens support and said tube are securely held, said main support being adapted for sliding movement in a direction parallel to the optical axis of said microscope, a guide supporting said main support, said main support for said guide being journalled on the wall of said microscope tube and projecting outwardly through a slot formed in said microscope tube, and means for effecting sliding movement of said main support with respect to said guide, said means including a rack secured to said main support, and a pinion meshing therewith, an axle mounted for rotation in said main support, said pinion being secured to one end of said axle, and a manually-actuated control button secured to the other end of said axle, said control button, when rotated, serving to rotate said axle and said pinion secured thereto, thus moving said rack and causing said main support to slide with respect to said guide in which said main support is held.

LORENZO FRANCESCHINI.

REFERENCES CITED

The following references are of record in the file of this patent:

UNITED STATES PATENTS

| Number | Name | Date |
| --- | --- | --- |
| 1,160,228 | Wild | Nov. 16, 1915 |
| 1,564,418 | Konig | Dec. 8, 1925 |
| 1,573,401 | Heine | Feb. 16, 1926 |
| 2,237,943 | Lihotzky | Apr. 8, 1941 |
| 2,427,689 | Osterberg et al. | Sept. 23, 1947 |

FOREIGN PATENTS

| Number | Country | Date |
| --- | --- | --- |
| 636,168 | Germany | Oct. 7, 1936 |

OTHER REFERENCES

Osterberg, "The Polanret Microscope," article in the Journal of the Optical Society, vol. 37, No. 9, pages 726 to 729, September 1947; published by Amer. Instit. of Physics, New York, N. J. (Photocopy in Division 7, 88–39 P.)

Jupnik et al., "Phase Microscopy with Vertical Illumination," article in the Journal of the Optical Society of America, vol. 38, No. 4, pages 338 to 341, April 1948. (Photocopy in Division 7 in 88–39 P.)